United States Patent [19]

Kunikawa

[11] Patent Number: 4,636,697

[45] Date of Patent: Jan. 13, 1987

[54] COPYING APPARATUS EQUIPPED WITH BRUSHLESS DC MOTOR

[75] Inventor: Norihide Kunikawa, Yao, Japan

[73] Assignee: Sharp Kabushiki Kaisha, Osaka, Japan

[21] Appl. No.: 709,065

[22] Filed: Mar. 6, 1985

[30] Foreign Application Priority Data

Mar. 15, 1984 [JP] Japan .................................. 59-50723

[51] Int. Cl.⁴ .............................................. H02K 29/06

[52] U.S. Cl. ...................................... 318/436; 318/40; 318/254; 355/14 R

[58] Field of Search .................... 318/138, 254, 254 A, 318/293, 436, 439, 445, 40; 355/14 R, 133

[56] References Cited

U.S. PATENT DOCUMENTS 3,854,080 12/1974 Bambara et al. .................... 318/436
4,416,536 11/1983 Itoh et al. ......................... 355/14 R
4,447,768 5/1984 Terui .................................. 318/293
4,455,515 6/1984 Uzuka ................................ 318/254
4,494,051 1/1985 Bailey ............................ 318/138 X

FOREIGN PATENT DOCUMENTS 55139084 10/1984 Japan .................................. 318/445

*Primary Examiner*—William M. Shoop, Jr.
*Assistant Examiner*—Bentsu Ro

[57] ABSTRACT

A copying apparatus equipped with a brushless DC motor for driving a light source, a photoreceptor drum, etc. and including a motor locking circuit for locking the DC motor. The motor locking circuit, when an external force has been applied to a rotor of the DC motor while the DC motor is not being actuated, causes an electric current to flow through a stator coil of the DC motor such that the electric current produces a reaction force counteracting the external force.

5 Claims, 6 Drawing Figures

COPYING APPARATUS EQUIPPED WITH BRUSHLESS DC MOTOR

BACKGROUND OF THE INVENTION

The present invention generally relates to a copying apparatus and more particularly, to a copying apparatus equipped with a brushless DC motor for driving a light source, a photosensitive or photoreceptor drum, etc. of the copying apparatus.

Conventionally, in copying apparatuses, it has been so arranged that a motor is used for scanning an original sheet to be copied or rotating a photoreceptor drum. A brushless DC motor is frequently employed as the motor. In order to scan the original sheet by using a rotational force of the motor in, for example, a copying apparatus of a type having a movable optical system, a light source is moved via an output shaft of the motor, pulleys, a wire and a fixing portion of the light source, which is attached to the wire. However, in the case where the copying apparatus has an apparatus housing split into an upper unit 1 and a lower unit 2 such that the upper unit 1 and the lower unit 2 can be retracted away from each other about a fulcrum 3 at the time of a maintenance operation of the copying apparatus or jamming of copy paper sheets as shown in FIG. 1, such a phenomenon may take place that a light source 4 is moved downwardly with the acceleration by its own weight from a start position (home position) A towards a limit position B when the upper unit 1 and the lower unit 2 have been retracted away from each other as shown in FIG. 2. At this time, if the light source 4 is allowed to move downwardly, the light source 4 proceeds beyond the limit position B into collision with a portion of the apparatus housing, thereby resulting in damage to a lamp of the light source 4 or deviation of an optical axis of the light source 4 from a predetermined position. In this case, the displacement of the light source 4 is transmitted to the output shaft of the motor through a wire 5 trained over the auxiliary pulleys 6 and 7, the auxiliary pulleys 6 and 7 and a pulley 8 which is coupled, in contact with the wire 5, with the output shaft of the motor. However, since the motor is subjected, as a force for holding the motor at a stop, to only a frictional resistance of the motor, it is impossible to prevent the displacement of the light source 4 unless another external force for holding the motor at a stop is applied to the motor. An interlocking switch 26 is provided at an interfacial portion between the upper unit 1 and the lower unit 2.

Furthermore, in a copying apparatus provided, as a photoreceptor, with a sheetlike photoreceptor 9 as shown in FIG. 3, since a joint portion 11 for retaining opposite ends of the photoreceptor 9 at an outer circumference of a drum 10 is required to confront a developing tank 12 at the time when the motor is not being actuated, forces applied to the drum 10 become non-uniform. Therefore, unless a sufficiently large force for holding a motor 13 at a stop is applied to the motor 13, the drum 10 is rotated in the clockwise direction in FIG. 3 from a position shown in FIG. 3 and thus, it becomes impossible to hold the drum 10 at the position shown in FIG. 3, at which the joint portion 11 and the developing tank 12 confront each other. Consequently, in the prior art copying apparatus of FIG. 3, it has been so arranged that a brake mechanism employing a solenoid or a brake plate is provided in the motor 13 so as to prevent rotation of the output shaft of the motor by a frictional force at the time when the motor is not being actuated. However, the known copying apparatus of FIG. 3 has such inconveniences that employment of the brake mechanism results in rise of its production cost and difficulty in making the copying apparatus compact in size.

SUMMARY OF THE INVENTION

Accordingly, an essential object of the present invention is to provide an improved copying apparatus equipped with a brushless DC motor, which is capable of locking the motor easily without the need for using a brake mechanism for preventing rotation of an output shaft of the motor by a friction force, with substantial elimination of the disadvantages inherent in conventional copying apparatuses of this kind.

In accomplishing this object according to one preferred embodiment of the present invention, there is provided an improved copying apparatus equipped with a brushless DC motor for driving driven members of the copying apparatus, with the driven members including a light source and a photoreceptor drum, the improvement comprising: a motor locking circuit for locking said DC motor, which, when an external force has been applied to a rotor of said DC motor while said DC motor is not being actuated, causes an electric current to flow through a stator coil of said DC motor such that said electric current produces a reation force counteracting said external force. Thus, in the copying apparatus of the present invention, when an external force has been applied to the rotor, a reaction force counteracting the external force is applied, as an electromagnetic force, between the stator and the rotor.

In accordance with the present invention, since a brake mechanism is not required to be provided and a locking force for locking the motor can be maintained at a predetermined value even after long-term service of the copying apparatus, it becomes possible to reliably and stably lock the motor.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 4:
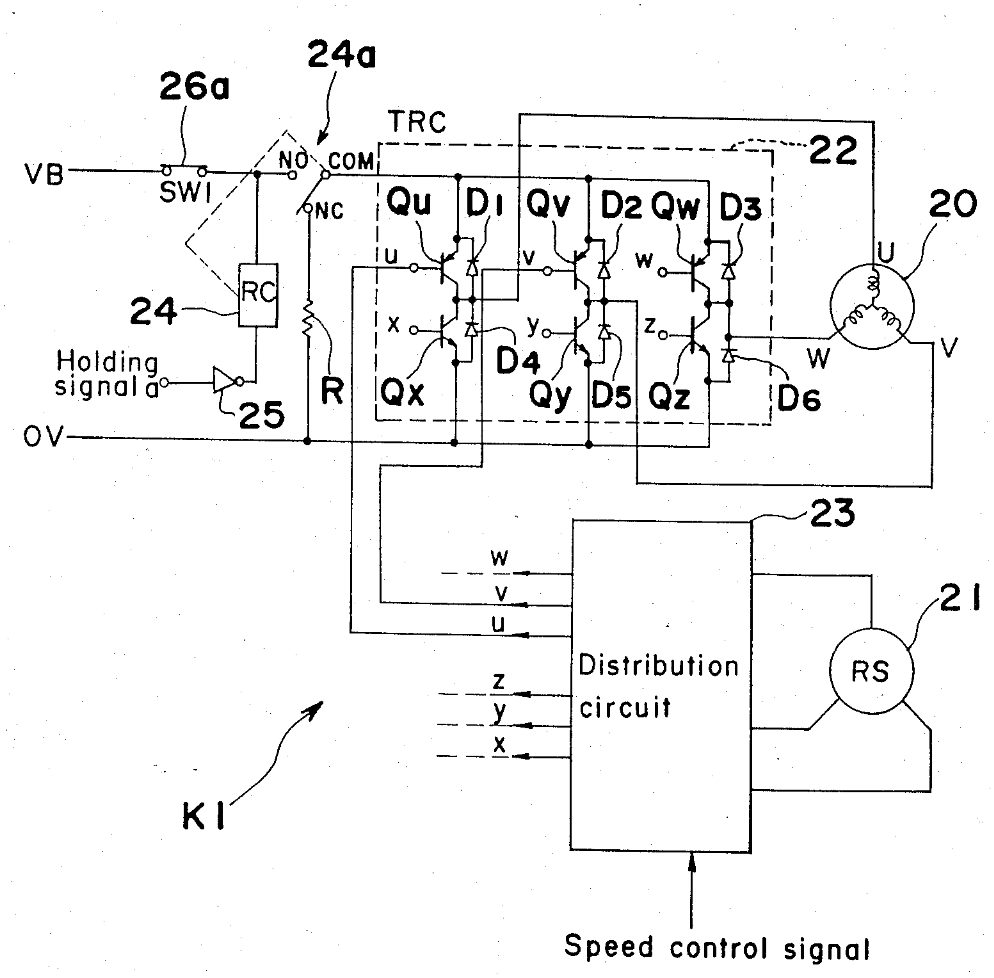
FIG. 4 is an electrical circuit diagram of a control circuit for controlling a brushless DC motor employed in a copying apparatus according to a first embodiment of the present invention.

Referring now to the drawings, there is shown in FIG. 4, a control circuit K1 for controlling a brushless DC motor employed in a copying apparatus according to a first embodiment of the present invention. The brushless DC motor is constituted by a stator. A sensor 21 for detecting positions of the rotor and the stator includes a three-phase stator coil 20 having phase coils U, V and W. The control circuit K1 generally includes a transistor commutator 22, a distribution circuit 23, a relay 24, an inverter 25 and a power source VB. A transistor commutator 22 includes six switching transistors Qu, Qv, Qw, Qx, Qy and Qz and six diodes D1, D2, D3, D4, D5 and D6 each bypassing in a reverse direction between an emitter and a collector of each of the transistors Qu to Qz. The transistors Qu to Qz have bases connected, respectively, to terminals u, v, w, x, y and z leading to the distribution circuit 23. The transistor commutator 22 causes electric current to flow through the coils U, V and W of the stator coil 20 sequentially so as to generate a rotating magnetic field. The distribution circuit 23 receives output signals from the sensor 21 and produces switching pulses for the transistor commutator 22 such that the rotating magnetic field generated at the stator coil 20 is brought into synchronism with rotation of the rotor by the switching pulses. The switching pulses are delivered to the terminals u, v, w, x, y and z in the sequence of the terminals u and z, the terminals v and x and the terminals w and y. Therefore, the phase coils U, V and W of the stator coil 20 are excited in the sequence of the phase coils U and W, the phase coils V and U and the phase coils W and V and thus, the rotating magnetic field is generated at the stator.

A contact 24*a* of the relay 24 is connected to a power supply line led from the power source VB to the transistor commutator 22. The contact 24*a* has a common terminal COM leading to the transistor commutator 22, a normally open terminal NO connected to the power source VB, and a normally closed terminal NC connected, via a resistor R, to an earth wire of the power source VB. When the inverter 25 has received a holding signal a, the relay 24 is set in a nonexciting state and thus, the contact 24*a* is set to the terminal NC. It is to be noted that the holding signal a is produced by a microcomputer (not shown) when the brushless DC motor is not being actuated. Furthermore, a contact 26*a* of an interlocking switch SW1 is provided, between the power source VB and the transistor commutator 22, in the power supply line. This contact 26*a* is arranged to be opened when the control circuit K1 should be interlocked.

Figure 1:
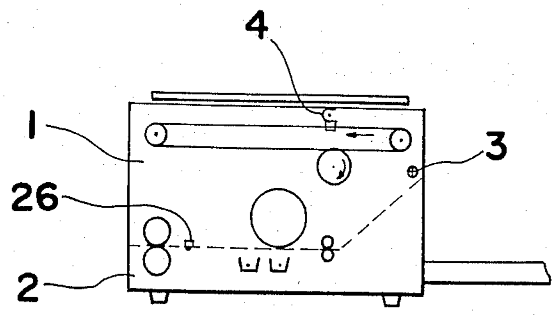
Fig. 1 PRIOR ART
FIG. 1 is a schematic sectional view of a prior art copying apparatus having an apparatus housing split into upper and lower units (already referred to)
Figure 2:
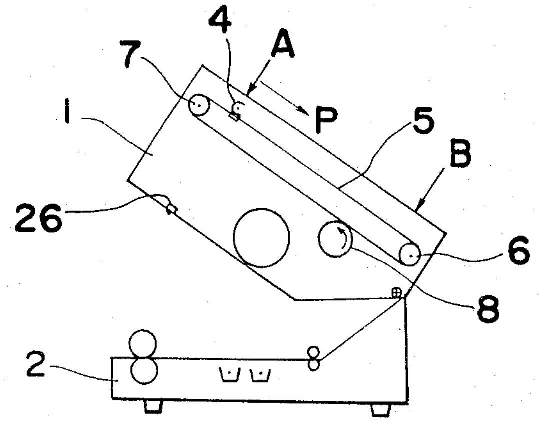
Fig. 2 PRIOR ART
FIG. 2 a schematic sectional view of the prior art copying apparatus of FIG. 1 at a time when the upper and lower units are retracted away from each other (already referred to)
Figure 3:
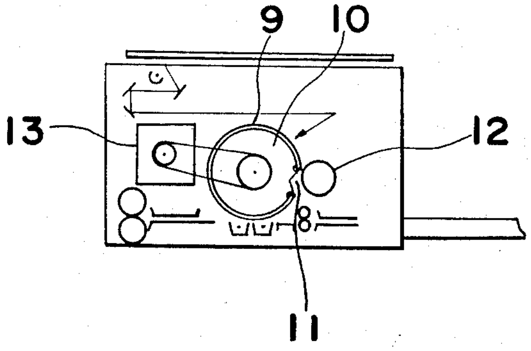
Fig. 3 PRIOR ART
FIG. 3 is a schematic sectional view of another prior art copying apparatus provided with a sheetlike photoreceptor (already referred to)

Although not specifically shown, in the case where the copying apparatus of the present invention has an apparatus housing split into upper and lower units as in the known copying apparatus of FIGS. 1 and 2, the interlocking switch SW1 corresponding to the interlocking switch 26 of the known copying apparatus of FIGS. 1 and 2 is provided at an interfacial portion between the upper and lower units. In the control circuit K1, since the contact 26*a* of the interlocking switch SW1 is provided in the power supply line as described above, excitation of the relay 24 is terminated at the moment when the upper and lower units have been retracted away from each other. In the control circuit K1, a motor locking circuit for locking the brushless DC motor is constituted by the diodes D1 to D6, the relay 24, the resistor R and the contact 26*a* of the interlocking switch SW1.

By the above described configuration of the control circuit K1, when the brushless DC motor is not being actuated, the holding signal a is generated and thus, the contact 24*a* of the relay 24 is set to the terminal NC. At this time, in the case where an external force is applied to the rotor for one cause or another so as to urge the rotor to rotate, a counter electromotive force is generated in the phase coils U, V and W of the stator coil 20. Irrespectively of properties of the switching pulses produced by the distribution circuit 23 at this time, a closed circuit for the counter electromotive force is formed through the diodes D1 to D6 connected, respectively, to the switching transistors Qu to Qz of the transistor commutator 22 and through the resistor R connected to the terminal NC of the contact 24*a*. Namely, all the counter electromotive force is consumed into heat energy by this closed circuit. In other words, an electric current flowing through the above described closed circuit applies a reaction force to the rotor subjected to the external force for urging the rotor to rotate and thus, the rotor is locked by the reaction force.

Meanwhile, in the prior art copying apparatus of FIGS. 1 and 2, the motor is required to be locked immediately when the upper unit 1 and the lower unit 2 have been retracted away from or coupled with each other during forward or return travel of the light source 4. However, in the copying apparatus of the present invention, excitation of the relay 24 can be terminated by the contact 26*a* of the interlocking switch SW1 immediately upon retraction of the upper and lower units away from each other or coupling of the upper and lower units with each other. Consequently, in the copying apparatus of the present invention, even if the holding signal a is generated with a certain time lag in the order of several hundred msec., it is possible to lock the motor before a light source (corresponding to the light source 4 of the known copying apparatus of FIGS. 1 and 2) proceeds beyond a limit position (corresponding to the limit position B of the known copying apparatus of FIGS. 1 and 2).

Figure 5:
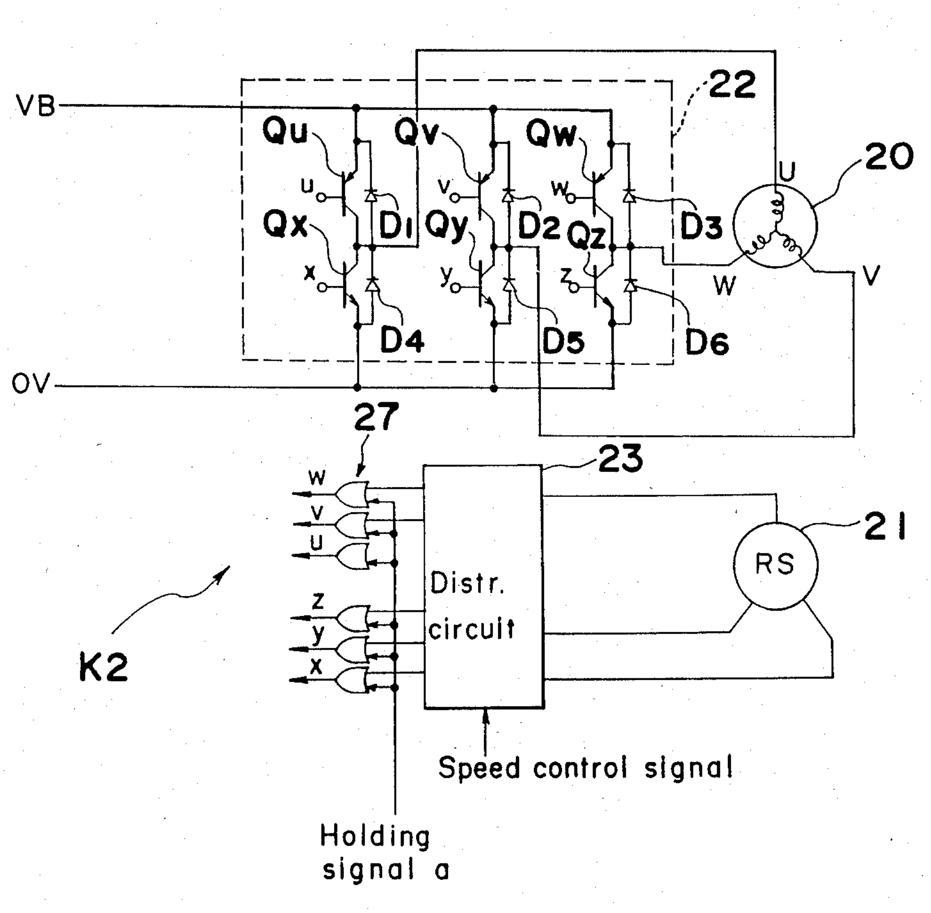
FIGS. 5 and 6 are views similar to FIG. 4, particularly showing second and third embodiments of the present invention, respectively.

Referring to FIG. 5, there is shown a control circuit K2 employed in a copying apparatus according to a second embodiment of the present invention. In this embodiment, output signals of the distribution circuit 23 and the holding signal a are delivered to the switching transistors Qu to Qz by way of a group 27 of six OR gates. Accordingly, when the holding signal a has been generated, the switching transistors Qu, Qv and Qw are turned off, while the switching transistors Qx, Qy and Qz are turned on. Thus, since the phase coils U, V and W of the stator coil 20 are set in a short-circuiting state, it becomes possible to lock the rotor subjected to the external force for urging the rotor to rotate, in the same manner as the first embodiment of the present invention. In this embodiment, the group 27 of the OR gates, which sets the phase coils U, V and W in the short-circuiting state when the holding signal a has been generated, functions as a motor locking circuit for locking the brushless DC motor.

Figure 6:
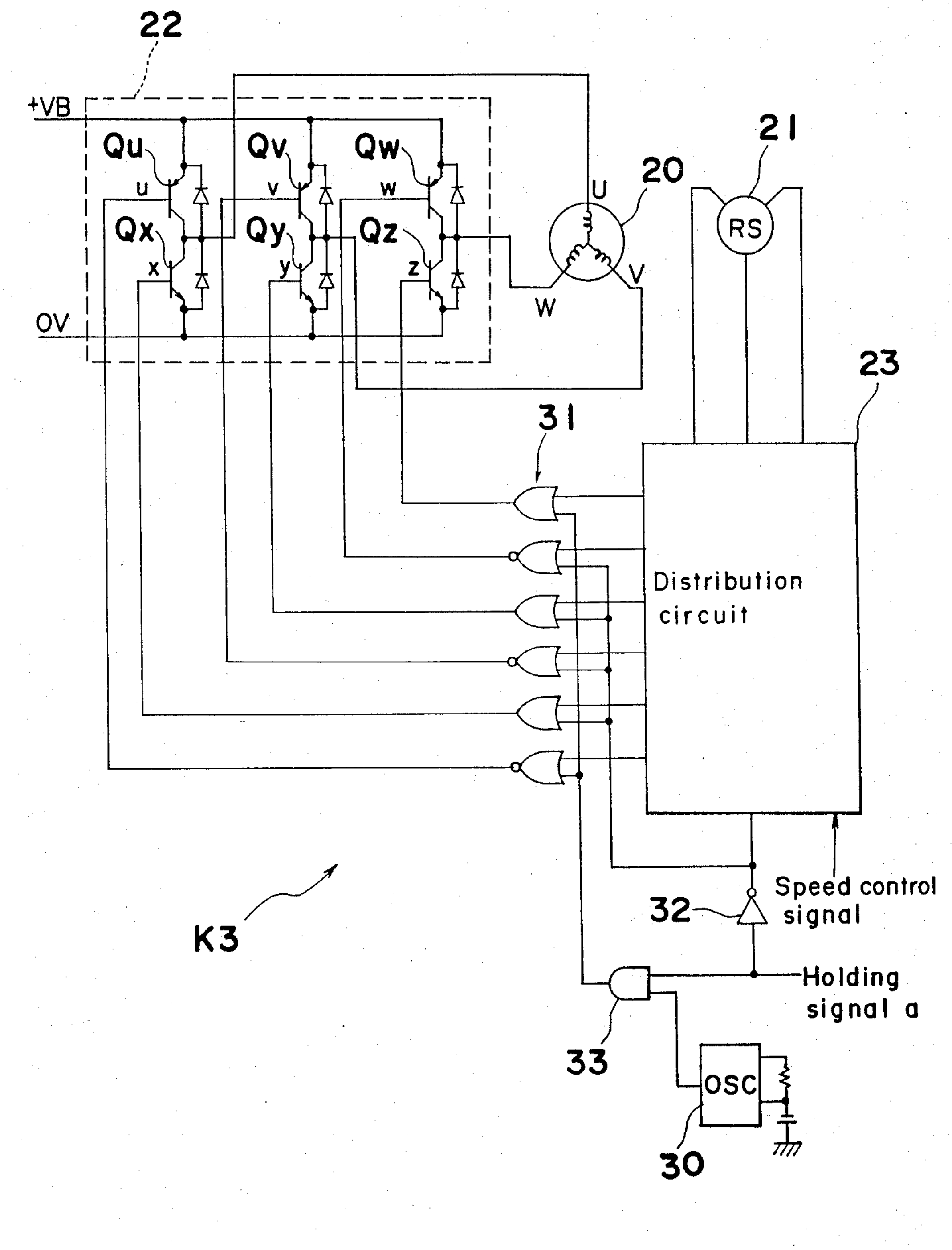

Referring further to FIG. 6, there is shown a control circuit K3 employed in a copying apparatus according to a third embodiment of the present invention. The control circuit K3 includes an oscillator 30, a group 31 of OR gates, an inverter 32 and an AND gate 33. In the control circuit K3, when the holding signal a has been generated, all the output signals of the distribution circuit 23 are set to the "LOW" states such that the transistor commutator 22 is prevented from effecting a switching operation except transistors Qu and Qz. Furthermore, an oscillating pulse of the oscillator 30 is supplied to the transistors Qu and Qz such that only the transistors Qu and Qz are turned on and off in synchronism with the oscillating pulse. Thus, a pulse current is caused to flow continuously through the phase coils U and W of the stator coil 20 in synchronism with the oscillating pulse. As a result, a fixed magnetic field having a predetermined vector is formed intermittently in the stator coil 20. Thus, even if an external force is applied to the rotor so as to urge the rotor to rotate, a torque counteracting the external force is generated at the rotor by the fixed magnetic field. In this case, it can be also so arranged that the phase coils U, V and W are subjected, through changeover thereof, to the pulse current in response to the output signal from the sensor 21. Meanwhile, a duty ratio of the oscillator 30 can be set at an arbitrary value in the range of permissible temperatures of the stator coil 20. In the control circuit K3, the oscillator 30, the group 31 of the OR gates, the inverter 32 and the AND gate 33 function as a motor locking circuit for locking the brushless DC motor. Since other configurations of the control circuits K2 and K3 are similar to those of the control circuit K1, detailed description thereof is abbreviated for the sake of brevity.

As is clear from the foregoing description, in the copying apparatus of the present invention, it is so arranged that when the brushless DC motor is not being actuated, all the phase coils of the stator coil is set in the short-circuiting state or the pulse current is caused to flow through only specific ones of the phase coils of the stator coil.

Thus, in accordance with the present invention, even if an external force is applied to the rotor so as to urge the rotor to rotate, it becomes possible to generate at the rotor a reaction force counteracting the external force.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A copying apparatus comprising:

a lower housing unit;

an upper housing unit pivotably mounted to said lower housing unit at a common fulcrum point for facilitating opening of said copying apparatus to perform maintenance operations thereon, said upper housing unit having located therein a movable member selected from a group consisting of a light source, an optical mirror system and photoreceptor means;

a brushless DC motor operatively connected to said movable member to facilitate the driving thereof, said DC motor including a stator coil and a rotor;

means for locking said DC motor in a stable position upon pivoting of said upper housing unit from said lower housing unit, said means for locking including, displacement detection means for detecting the separation of said upper and lower housing units by an external force, said displacement detection means including an interlocking switch, said displacement detection means developing a housing open signal when said upper housing unit is pivotably moved from said lower housing unit, and control circuit means, responsive to said housing open signal developed by said displacement detection means for applying a rotor lock current to the stator coil of said DC motor to prevent the movement of said movable member caused by the opening of said apparatus by inhibiting rotation of said DC motor.

2. A copying apparatus according to claim 1, wherein said housing open signal developed by said displacement detection means is logically high when said copying apparatus is closed and logically low when said apparatus is open.

3. A copying apparatus according to claim 2, wherein said control circuit means of said means for locking further functions to control said DC motor during normal operation of said apparatus and includes a power source, sensor means for detecting the position of the rotor of said brushless DC motor and producing output signals representative thereof;

said stator including a three-phase coil for generating a rotating magnetic field;

transistor means for applying an electric current to said stator coil, said transistor means including a plurality of switching transistors and having an emitter and a collector and a plurality of corresponding diodes connected thereacross, each of said plurality of diodes allowing reverse current flow across the emitter and collector of each of said plurality of transistors, said transistor means causing electric current to sequentially flow through said three-phase stator coil to generate the rotating magnetic field to drive said rotor;

a distribution circuit responsive to the output signals from said sensor means, for producing switching pulses applied to said transistor means to drive the stator coil;

a relay, operatively connected between said power source and said transistor means, said relay including a contact having a common terminal to said transistor means, a normally open terminal connected to said power source, and a normally closed terminal connected to an earth wire of said power source via a resistor; and inverter means, responsive to a holding signal generated when said DC motor is not being actuated, for setting said relay means in a non-excited state, wherein excitation of said relay means is terminated when said upper and lower units are separated to enable generation of a counter electromotive force in said three phase coil to inhibit rotation of said DC motor.

4. A copying apparatus according to claim 3, wherein said control circuit means causes a pulse current to flow through specific ones of said three-phase stator coils when said DC motor is not being actuated.

5. A copying apparatus according to claim 3, wherein said control circuit means generates said counter electromotive force by setting all of said phase coils of said stator coil in a short-circuited state when said DC motor is not being actuated.

* * * * *